(12) United States Patent
Kothari et al.

(10) Patent No.: US 8,902,730 B2
(45) Date of Patent: *Dec. 2, 2014

(54) REDUNDANT PSEUDOWIRES FOR BORDER GATEWAY PATROL-BASED VIRTUAL PRIVATE LOCAL AREA NETWORK SERVICE MULTI-HOMING ENVIRONMENTS

(75) Inventors: Bhupesh Kothari, San Jose, CA (US); Rahul Aggarwal, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 503 days.

This patent is subject to a terminal disclaimer.

(21) Appl. No.: 13/354,136

(22) Filed: Jan. 19, 2012

(65) Prior Publication Data

US 2012/0113803 A1 May 10, 2012

Related U.S. Application Data

(63) Continuation of application No. 12/495,095, filed on Jun. 30, 2009, now Pat. No. 8,144,575.

(51) Int. Cl.
*G01R 31/08* (2006.01)
*H04L 12/721* (2013.01)
(Continued)

(52) U.S. Cl.
CPC ............ *H04L 41/0663* (2013.01); *H04L 45/68* (2013.01); *H04L 45/16* (2013.01); *H04L 45/28* (2013.01); *H04L 45/00* (2013.01); *H04L 45/66* (2013.01); *H04L 12/4633* (2013.01); *H04L 45/507* (2013.01); *H04L 45/245* (2013.01); *H04L 45/22* (2013.01); *H04L 45/54* (2013.01); *H04L 45/04* (2013.01)
USPC ...... 370/218; 370/227; 370/228; 370/395.31; 370/395.53; 709/224; 709/239

(58) Field of Classification Search
USPC ......... 370/216–218, 221, 225, 227, 254, 255, 370/395.31, 395.53; 709/224, 238, 239
See application file for complete search history.

(56) References Cited

U.S. PATENT DOCUMENTS 7,386,605 B2   6/2008   Shah
7,715,310 B1   5/2010   Sajassi et al.
(Continued)

FOREIGN PATENT DOCUMENTS

CN       1870637 A    11/2006
CN     101043386 A     9/2007
(Continued)

OTHER PUBLICATIONS

European Search Report corresponding to EP 09 17 9731, mailed Feb. 18, 2010, 9 pages.

(Continued)

*Primary Examiner* — Jeffrey M Rutkowski
(74) *Attorney, Agent, or Firm* — Harrity & Harrity, LLP

(57) ABSTRACT

A method performed by a provider edge device includes generating pseudo-wire tables based on virtual private local area network service advertisements from other provider edge devices, where the provider edge device services customer edge devices, and establishing pseudo-wires with respect to the other provider edge devices, based on the pseudo-wire tables, where the pseudo-wires include an active pseudo-wire and at least one standby pseudo-wire with respect to each of the other provider edge devices. The method also includes generating and advertising VPLS advertisement to the other provider edge devices, detecting a communication link failure associated with one of the customer edge devices in which the provider edge device services, and determining whether the at least one standby pseudo-wire needs to be utilized because of the communication link failure.

20 Claims, 10 Drawing Sheets

(51) Int. Cl.

| | | |
|---|---|---|
| *H04L 12/761* | (2013.01) | |
| *H04L 12/703* | (2013.01) | |
| *H04L 12/701* | (2013.01) | |
| *H04L 12/46* | (2006.01) | |
| *H04L 12/723* | (2013.01) | |
| *H04L 12/709* | (2013.01) | |
| *H04L 12/707* | (2013.01) | |
| *H04L 12/741* | (2013.01) | |
| *H04L 12/24* | (2006.01) | |
| *H04L 12/715* | (2013.01) | |

(56) References Cited

U.S. PATENT DOCUMENTS

| | | | |
|---|---|---|---|
| 7,940,652 | B1 | 5/2011 | Pan |
| 8,023,506 | B2 * | 9/2011 | Wei ................... 370/395.53 |
| 8,144,575 | B2 * | 3/2012 | Kothari et al. ............ 370/218 |
| 8,259,725 | B2 * | 9/2012 | Sun et al. ............. 370/395.31 |
| 8,437,248 | B2 * | 5/2013 | Li et al. ................... 370/217 |
| 2004/0174887 | A1 | 9/2004 | Lee |
| 2005/0281190 | A1 | 12/2005 | McGee et al. |
| 2006/0164975 | A1 | 7/2006 | Filsfils et al. |
| 2008/0123651 | A1 | 5/2008 | Vasseur et al. |
| 2008/0285442 | A1 | 11/2008 | Bruckman et al. |
| 2009/0285089 | A1 | 11/2009 | Srinivasan |
| 2010/0329109 | A1 | 12/2010 | Kothari et al. |
| 2012/0201127 | A1 * | 8/2012 | Voit et al. ................. 370/225 |
| 2012/0224584 | A1 * | 9/2012 | Zhang et al. .......... 370/395.53 |

FOREIGN PATENT DOCUMENTS

| | | |
|---|---|---|
| CN | 101106486 A | 1/2008 |
| CN | 101340351 | 1/2009 |
| WO | WO 2007/144870 A1 | 12/2007 |

OTHER PUBLICATIONS

K. Kompella et al.: "Multi-homing in BGP-based Virtual Private LAN Service," AT&T, Nov. 3, 2008; http://tools.ietf.org/html/draft-kompella-l2vpn-vpls-multihoming-02, 27 pages.

* cited by examiner

US 8,902,730 B2

REDUNDANT PSEUDOWIRES FOR BORDER GATEWAY PATROL-BASED VIRTUAL PRIVATE LOCAL AREA NETWORK SERVICE MULTI-HOMING ENVIRONMENTS

RELATED APPLICATION

This application is a continuation of U.S. patent application Ser. No. 12/495,095 filed Jun. 30, 2009, which is incorporated herein by reference.

BACKGROUND

In Virtual Private Local Area Network (LAN) Service (VPLS) multi-homing environments, there may be instances when a customer site is multi-homed to more than one provider edge device (PE) in order to provide redundant connectivity. Each PE creates a pseudo-wire (PW), which constitutes the data plane, to connect to every other PE, so that a fully-meshed connection scheme is established. Regardless of the number of customer sites serviced by the PE, only one pseudo-wire (PW) is created on the PE with respect to another PE. For example, a PE that services two customer sites may establish only one PW that provides a connection from the PE to another PE. Under this framework, when a communication link between one of the customer sites and the PE fails, the PE tears down its PW, and then rebuilds its PW. Unfortunately, during this procedure, traffic to and from the other customer site to which the PE services is adversely impacted.

SUMMARY

According to one implementation, a method may include generating, by a provider edge device (PE), pseudo-wire (PW) tables based on virtual private local area network service (VPLS) advertisements received from other PEs, where the PE services customer edge devices (CEs); establishing, by the PE, PWs with respect to the other PEs, based on the PW tables, where the PWs include an active PW and at least one standby PW with respect to each of the other PEs, in correspondence to the CEs in which the PE services; generating, by the PE, a VPLS advertisement advertising, by the PE, the generated VPLS advertisement to the other PEs; detecting, by the PE, a communication link failure associated with one of the CEs; determining, by the PE, whether the at least one standby PW needs to be utilized because of the communication link failure; and utilizing, by the PE, the at least one standby PW when it is determined that the standby PW needs to be utilized.

According to another implementation, a provider edge device (PE) may include logic to: generate pseudo-wire (PW) tables based on advertisements received from other PEs, where the PE services customer edge devices (CEs); establish PWs based on the PW tables, with respect to each of the other PEs, where the PWs include an active PW with respect to each of the other PEs and at least one standby PW with respect to each of the other PEs; generate an advertisement; provide the advertisement to the other PEs; detect a communication link failure between the PE and one of the CEs; and determine whether a state of the at least one standby PW needs to be changed to an active state based on the communication link failure.

According to yet another implementation, a computer-readable medium may store instructions that executable by at least one processor. The computer-readable medium may include one or more instructions for generating pseudo-wire (PW) tables based on virtual private local area network service (VPLS) network layer reachability information (NLRI) received from provider edge devices (PEs); one or more instructions for establishing PWs, with respect to each of the PEs, based on the PW tables, where the PWs include an active PW and at least one standby PW and where the PWs are associated with customer edge devices (CEs); one or more instructions for detecting a communication link failure with respect to one of the CEs; and one or more instructions for determining whether the at least one standby PW needs to be utilized based on the communication link failure.

According to still another implementation, a provider edge device (PE) may include means for generating pseudo-wire (PW) data based on virtual private local area network service (VPLS) advertisements received from other PEs, where the PE services customer edge devices (CEs) that are associated with customer sites; means for establishing PWs, based on the PW data, with respect to each of the other PEs, where the PWs include an active PW with respect to each of the other PEs and at least one standby PW with respect to each of the other PEs, and where a total number of the PWs, with respect to each of the other PEs corresponds to a total number of the CEs; means for detecting a communication failure with respect to one of the CEs; and means for determining whether a state of the at least one standby PW needs to be changed to an active state, with respect to at least one of the other PEs, based on the communication link failure.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following description does not limit the invention. Rather, the scope of the invention is defined by the appended claims and equivalents.

The term "data unit," as used herein, may refer to a packet, a datagram, a frame, or a cell, a fragment of a packet, a fragment of a datagram, a fragment of a frame, a fragment of a cell, or another type or arrangement of data.

Embodiments described herein provide for methods, devices, and/or systems that establish and utilize redundant PWs. Traffic may be forwarded on an active PW while standby PWs may exist for other locally-attached customer sites. In this framework, when a connection between a customer site and its serving PE fails, the other customer sites served by the PE may be unaffected by the connection failure because of the standby PWs. In an exemplary implementation, when a connection failure occurs, a serving PE may broadcast the connection failure to other PEs. Each PE may re-evaluate its incoming and outgoing PWs that provide connections with the other PEs. That is, an incoming PW corresponds to a PW from another PE to a specific PE and an outgoing PW corresponds to a PW from the specific PE to the other PE. In some instances, when a connection failure occurs, an active PW may need to be changed to a standby state and a standby PW may need to be changed to an active state. In other instances, when a connection failure occurs, an active PW may remain active and/or a standby PW may remain in a standby state. Additionally, when a customer site is multi-homed (i.e., a customer site is connected to two or more PEs) and a connection between a customer site and its serving PE fails, in some instances, another PE may provide service to the customer site. For example, the other PE may change a PW from a standby state to an active state to provide service to the customer site.

Figure 1A:
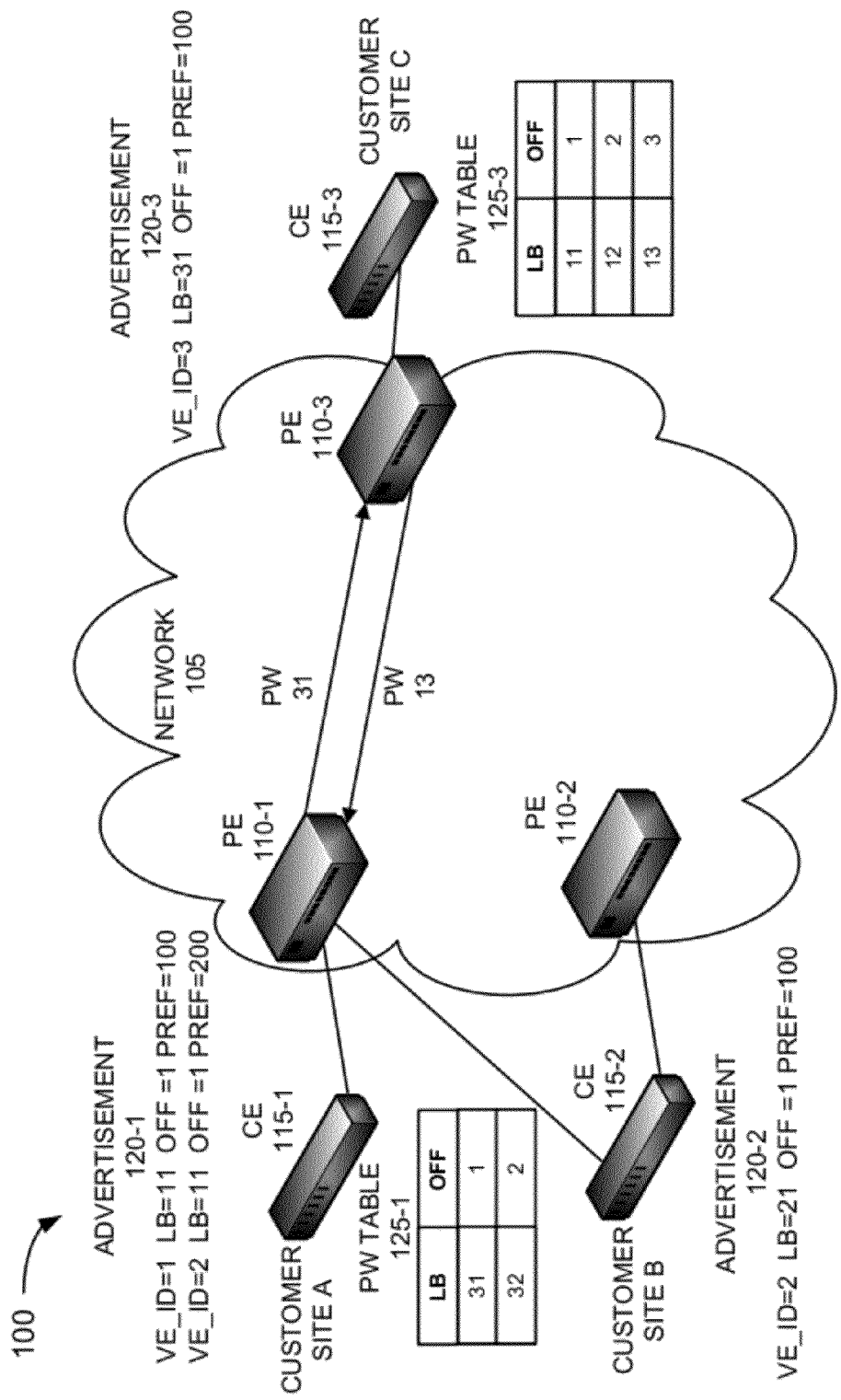
FIGS. 1A and 1B are diagrams illustrating an overview of exemplary embodiments described herein.
Figure 1B:
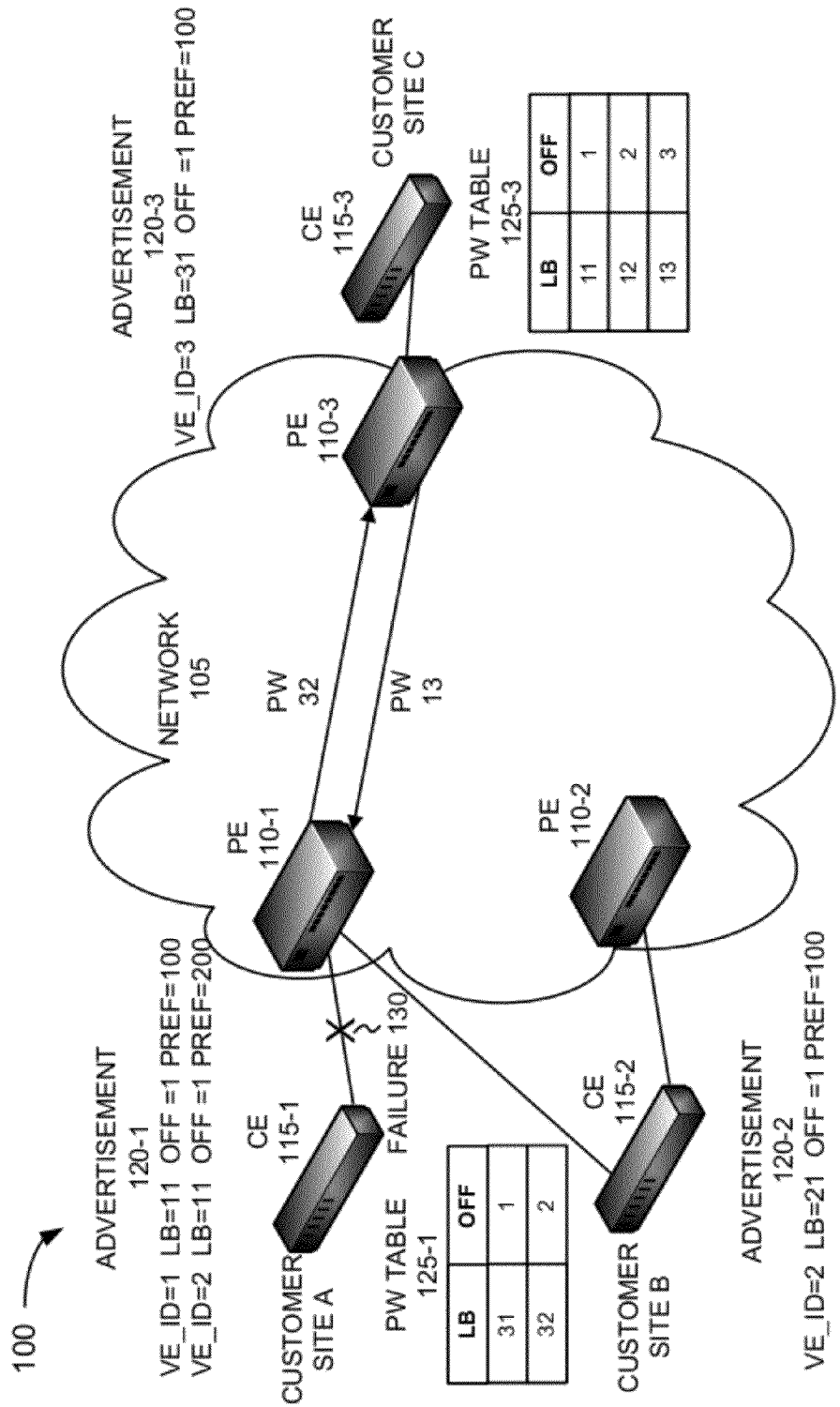

FIGS. 1A and 1B are diagrams illustrating an overview of exemplary embodiments described herein. As shown, an exemplary environment 100 may include a network 105, PEs 110-1 through 110-3 (referred to generally as PE 110), and customer edge devices (CEs) 115-1 through 115-3 (referred to generally as CE 115). CEs 115-1, 115-2, and 115-3 may be associated with customer sites A, B, and C, respectively, as illustrated in FIGS. 1A and 1B.

The number of devices and configuration in environment 100 is exemplary and provided for simplicity. In practice, environment 100 may include more, fewer, different, and/or differently arranged devices than those illustrated in FIGS. 1A and 1B. For example, while FIGS. 1A and 1B illustrate three PEs 110 and three CEs 115, environment 100 may include more or less than three PEs 110 and/or three CEs 115. Additionally, or alternatively, while CE 115-2 is multi-homed to two PEs 110 (i.e., PE 110-1 and PE 110-2), CE 115-2 may be multi-homed to more than two PEs 110. Also, some functions described as being performed by a particular device may be performed by a different device or a combination of devices.

Network 105 may include, for example, a multiprotocol label switching (MPLS)-based network, a border gateway protocol (BGP)-based network, and/or a VPLS multi-homed network. Network 105 may correspond to a service provider network.

PE 110 may include a network device capable of communicating with other devices, systems, networks, and/or the like. For example, PE 110 may correspond to a network computer, a router, a gateway, an access device, or some other type of communication device that may process and/or forward network traffic. As described, PE 110 may provide connectivity between customer sites. In some instances, PE 110 may serve more than one customer site.

CE 115 may include a device capable of communicating with other devices, systems, networks, and/or the like. For example, CE 115 may correspond to a router, a network computer, an access device, a user device (e.g., a desktop computer, laptop computer, etc.), or some other type of communication device. CE 115 may correspond to an Ethernet device associated with a customer site.

Referring to FIG. 1A, in an exemplary implementation, PEs 110 may advertise information associated with the customer sites that they serve. For example, PE 110-1 may service customer site A via CE 115-1 and customer site B via CE 115-2; PE 110-2 may service customer site B via CE 115-2; and PE 110-3 may service customer site C via CE 115-3. In this example, customer site B may be multi-homed to PEs 110-1 and 110-2 to provide redundant connectivity to network 105. PE 110-1 may advertise an advertisement 120-1 to PEs 110-2 and 110-3, PE 110-2 may advertise an advertisement 120-2 to PEs 110-1 and 110-3, and PE 110-3 may advertise an advertisement 120-3 to PEs 110-1 and 110-2. Advertisements 120-1, 120-2, and 120-3 may be generally referred to as advertisement 120.

The information included in advertisement 120 may correspond to VPLS network layer reachability information (NLRI) or a VPLS advertisement. By way of example, but not limited thereto, advertisement 120-1 may include VE_ID=1, LB=11, OFF=1, PREF=100 for customer site A, and VE_ID=2, LB=11, OFF=1 PREF=200 for customer site B. VE_ID may correspond to a customer site identifier. For example, VE_ID=1 may correspond to an identifier for customer site A and VE_ID=2 may correspond to an identifier for customer site B. Label base (LB) may correspond to a starting value of a label in an advertised label block. In this example, the starting value is equal to 11. Block offset (OFF) (also referred to as VE block offset) may correspond to a starting customer site ID value that may map to the LB contained in advertisement 120-1. In this example, the starting value is equal to 1. OFF may be used to identify the label block from which a particular label value may be selected to setup a PW for a remote customer site, as will be described below. Preference (PREF) may correspond to a value that may influence the selection of a customer site. For example, the higher the PREF value, the better or more important the customer site may be considered. In this example, customer site A is assigned a PREF value of 100, while customer site B is assigned a PREF value of 200.

Advertisement 120-1 (and more generally advertisement 120) may include other types of parameters (e.g., BLOCK SIZE, etc.), such as, for example, the parameters described in Request For Comments (RFC) 4761. PEs 110-2 and 110-3 may advertise similar information for customer sites B and C, respectively, to the other PEs 110, via advertisements 120-2 and 120-3. VE_ID, LB, OFF, and PREF, will be described in greater detail below.

Referring to advertisement 120-1, a local PE 110 (e.g., PE 110-1) may allocate the same set of label bases (i.e., LB values) to each of the customer sites that it services so that any remote PE (e.g., PE 110-2 and PE 110-3) may create one PW for sending traffic to the local PE. For example, as illustrated in advertisement 120-1, the LBs for each of customer sites A and B are the same (i.e., LB=11). In addition, the OFFs for each of customer sites A and B are the same (i.e., OFF=1). As described below, the LB values and the OFF values may be used to create PW tables 125.

PEs 110 may create PW tables 125. For example, as illustrated in FIG. 1A, PE 110-1 may create a PW table 125-1. PE 110-1 may create PW table 125-1 based on LB and OFF parameters (or values) associated with advertisement 120-3 of PE 110-3. As illustrated, PW table 125-1 may include entries, such as, for example, LB=31 and OFF=1 and LB=32 and OFF=2. LB=31 and OFF=1, which correspond to LB=31 and OFF=1 advertised in advertisement 120-3, may be used as starting values to create the entries in PW table 125-1. PW table 125-1 may include the outgoing PWs from PE 110-1 to PE 110-3. Since PE 110-1 services customer sites A and B, PE 110-1 may increment from the starting values (e.g., by one) to provide the entries LB=32 and OFF=2. In this way, LB=31 and OFF=1 may correspond to customer site A, and LB=32 and OFF=2 may correspond to customer site B.

Based on these entries, PE 110-1 may establish PWs 31 and 32 with respect to PE 110-3. However, PW 31 may be designated as the active PW (i.e., PW 31 may be in an active state), while PW 32 may be designated as the standby PW (i.e., PW 32 may be in a standby state). For example, based on the entries LB=31 and OFF=1, PE 110-1 may setup PW 31, which connects PE 110-1 to PE 110-3 and numerically (i.e., PW 31) corresponds to LB=31, as an active PW. In one embodiment, PE 110-1 may select the active PW (i.e., PW 31) based on the lowest VE_ID (i.e., VE_ID=1) to which PE 110-1 services. That is, OFF=1 and OFF=2, in PW table 125-1, may numerically correspond to VE_ID 1 (for customer site A), and VE_ID 2 (for customer site B). PE 110-1 may refer to PW table 125-1 and may match the lowest VE_ID (i.e., VE_ID=1) with OFF=1, which is mapped to LB=31 and corresponds to PW 31. PE 110-1 may designate a standby PW (e.g., PW 32). That is, PE 110-1 may refer to PW table 125 and may match the second lowest VE_ID (i.e., VE_ID=2) with OFF=2, which is mapped to LB=32 and corresponds to PW 32.

PE 110-2 and PE 110-3 may create their own PW tables 125. For example, PE 110-3 may create PW table 125-3 based on advertisement 120-1. PE 110-3 may utilize the LB and OFF values associated with advertisement 120-1 to build PW table 125-3. In this example, LB=11 and OFF=1. In a similar manner, PE 110-3 may build PW table 125-3 by incrementing from these starting values. In this example, the lowest VE_ID value of the customer site to which PE 110-3 services, is 3. PE 110-3 may increment the LB and OFF values until OFF=3. PE 110-3 may refer to PW table 125-3 and may match the lowest VE_ID (i.e., VE_ID=3) with OFF=3, which is mapped to LB=13 and corresponds to PW 13. PE 110-3 may designate PW 13 as the active outgoing PW to PE 110-1.

Based on this framework, referring to FIG. 1B, assume that a failure 130 occurs on a connection between CE 115-1 and PE 110-1. As previously described, under existing approaches, PW 31 may be torn down and network traffic associated with both customer sites A and B may be affected. However, as illustrated in FIG. 1B, when PE 110-1 discovers failure 130, PW 110-1 may send network traffic on PW 32. For example, PE 110-1 may notify PEs 110-2 and 110-3 of failure 130 (i.e., a connection failure between CE 115-1 and PE 110-1). PE 110-1 may switch from PW 31, which was the active PW, to PW 32, which now becomes the active PW. PE 110-1 may change the state of PW 31 to a standby PW. When PE 110-1 receives network traffic from customer site B, via CE 115-2, to PE 110-3, PE 110-1 may utilize PW 32. In this regard, customer site B may suffer no impact as a result of failure 130.

Additionally, PE 110-1 may determine which PW to expect traffic from PE 110-3 after failure 130 occurs. In this instance, PE 110-1 may determine that PE 110-3 will continue to utilize PW 13 since PE 110-1 may still forward traffic to CE 115-2. Similarly, PEs 110-3 and 110-2 may re-evaluate whether incoming and outgoing PWs will change, with respect to other PEs, once notified of failure 130.

Since the embodiments have been broadly described, variations exist. Accordingly, a detailed description of the embodiments is provided below.

Exemplary Device Architecture

Figure 2:
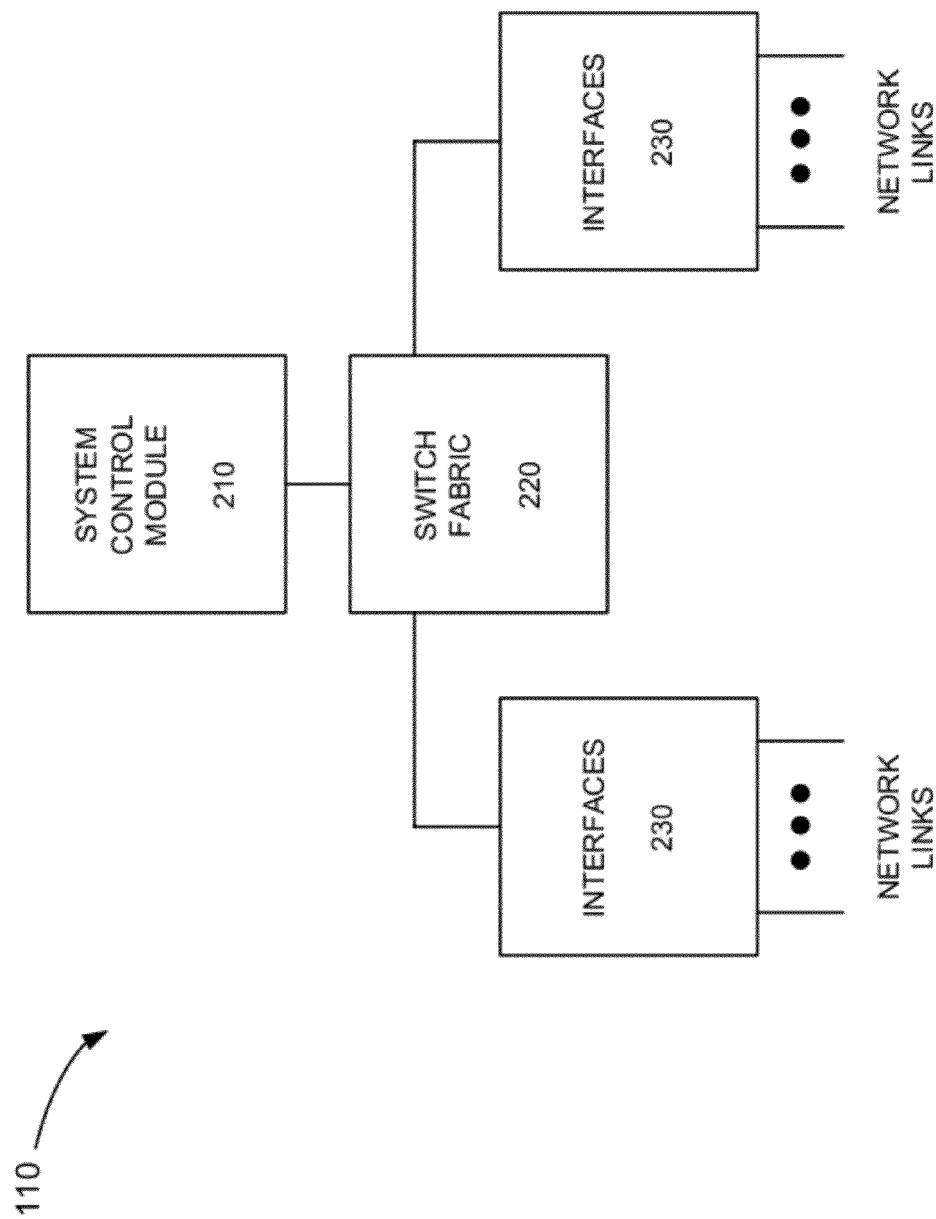
FIG. 2 is a diagram illustrating exemplary components of a PE depicted in FIGS. 1A and 1B.

FIG. 2 is a diagram illustrating exemplary components of PE 110. As illustrated in FIG. 2, PE 110 may include, for example, a system control module 210, a switch fabric 220, and a group of interfaces 230.

System control module 210 may include one or multiple processors, microprocessors, application specific integrated circuits (ASICs), field programming gate arrays (FPGAs), and/or processing logic that may be optimized for networking and communications. System control module 210 may perform high level management functions for PE 110. For example, system control module 210 may communicate with other networks, devices, and/or systems connected to PE 110 to exchange information regarding network topology. In some implementations, system control module 210 may include a routing engine for creating routing tables based on network topology information, creating forwarding tables (e.g., a Forwarding Information Base (FIB)) based on the routing tables, and sending these tables to interfaces 230 for data unit routing. System control module 210 may also include a static memory (e.g. a read only memory (ROM)), a dynamic memory (e.g. a random access memory (RAM)), onboard cache, and/or flash memory for storing data and/or machine-readable instructions.

Switch fabric 220 may include one or multiple switching planes to facilitate communication among interfaces 230 and/or system control module 210. In one implementation, each of the switching planes may include a single-stage switch or a multi-stage switch of crossbar elements. Switch fabric 220 may also, or alternatively, include processors, memories, and/or paths that permit communication among system control module 210 and interfaces 230.

Interfaces 230 may include devices or assemblies, such as line cards, for receiving incoming data units from network links (or from other interfaces 230) and for transmitting the data units to network links (or to other interfaces 230). For example, interfaces 230 may include wired interfaces, such as, Ethernet interfaces, optical carrier (OC) interfaces, and/or asynchronous transfer mode (ATM) interfaces. Interfaces 230 may manage a set of input ports via which data units can be received and a set of output ports via which data units can be transmitted. Interfaces 230 may include memory, one or more processors, and/or other logic.

Depending on the implementation, the components that are illustrated in FIG. 2 may provide fewer or additional functionalities. For example, if PE 110 performs an Internet Protocol (IP) data unit routing function as part of a MPLS router, system control module 210 may perform tasks associated with obtaining routing information from other routers in a MPLS network. In such cases, conveying network traffic from one interface to another may involve label-based routing, rather than IP address-based routing.

PE 110 may perform operations and/or processes related to the setting up and utilization of redundant PWs. According to an exemplary implementation, PE 110 may perform these operations and/or processes in response to system control module 210 executing sequences of instructions contained in a computer-readable medium. A computer-readable medium may be defined as a physical or logical memory device. A logical memory device may include memory space within a single physical memory device or spread across multiple physical memory devices. For example, software instructions may be read into a memory from another computer-readable medium or from another device via interfaces 230. The software instructions contained in the memory may cause system control module 210 to perform processes that are described herein. Alternatively, hardwired circuitry may be used in place of or in combination with software instructions to implement processes described herein. Thus, implementations described herein are not limited to any specific combination of hardware circuitry and software.

Although, FIG. 2 illustrates exemplary components of PE 110, in other implementations, PE 110 may include additional, fewer, different, or differently arranged components than those illustrated in FIG. 2 and described herein. Additionally, or alternatively, one or more operations described as being performed by a particular component of PE 110 may be performed by one or more other components, in addition to or instead of the particular component.

Figure 3A:
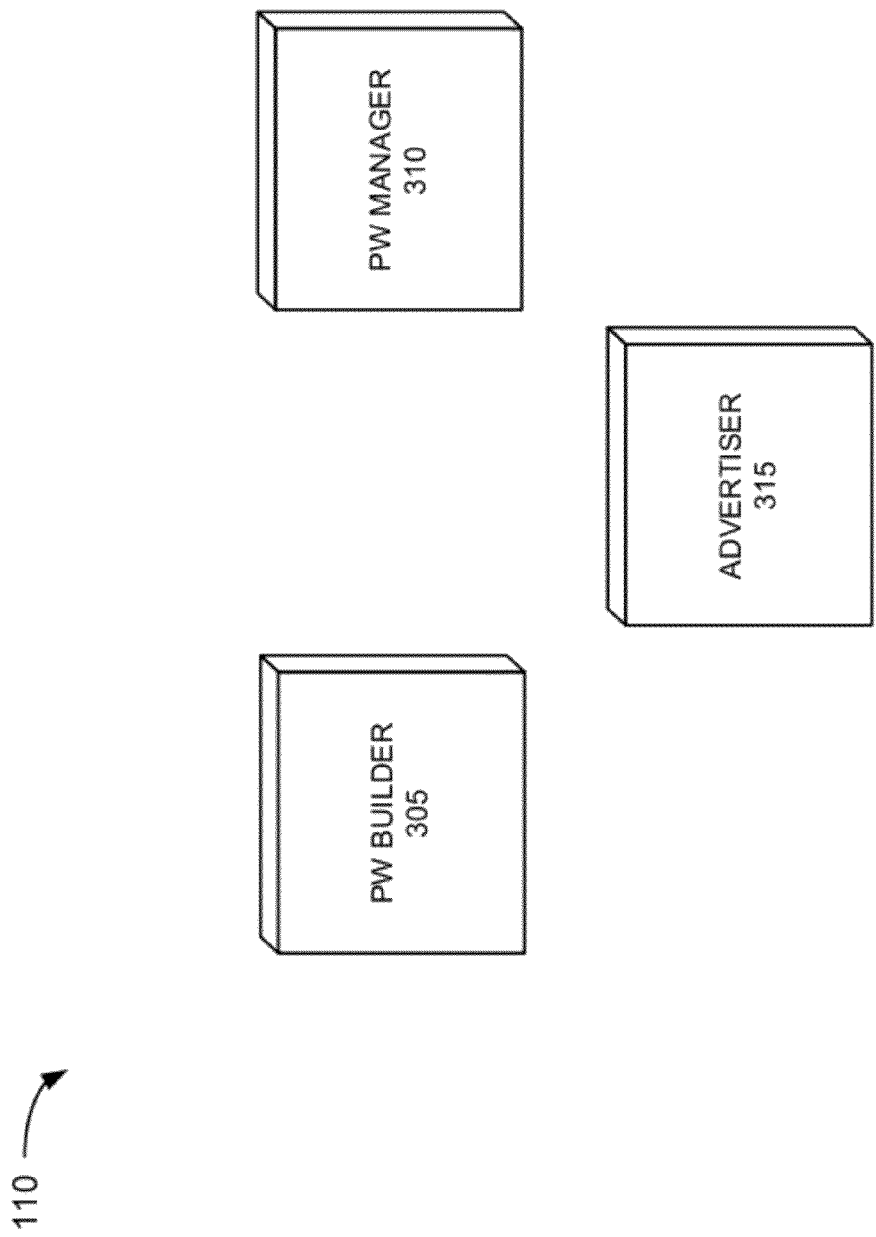
FIG. 3A is a diagram illustrating exemplary functional components of the PE.

FIG. 3A is a diagram illustrating exemplary functional components of PE 110. As illustrated in FIG. 3A, PE 110 may include a PW builder 305, a PW manager 310, and an advertiser 315. PW builder 305, PW manager 310 and/or advertiser 315 may be implemented wholly, or partially, in system control module 210. The functional components illustrated in FIG. 3A may be implemented by hardware (e.g., one or more processors or other processing logic) or a combination of hardware and software. While a particular number and arrangement of functional components are illustrated in FIG. 3A, in other implementations, PE 110 may include fewer, additional, different, or differently arranged functional components than those illustrated in FIG. 3A.

PW builder 305 may build PW tables 125. PW builder 305 may build PW tables 125 based on a received advertisements 120 from other PEs 110. In one implementation, PW builder 305 may utilize LB and OFF parameters associated with an advertisement 120 to create PW table 125. In instances that PE 110 services more than one customer site, PW builder 305 may designate an active PW and one or more standby PWs. In one embodiment, PW builder 305 may designate the active PW based on the customer site having the lowest VE_ID value. In other embodiments, PW builder 305 may designate the active PW based on some other user-configured selection process.

PW manager 310 may setup and maintain PWs based on PW table 125. PW manager 310 may initially select the PWs to utilize for incoming and outgoing PWs with respect to each of the other PEs and the customer sites it services. When a communication link failure is detected, PW may notify the other PEs 110. PW manager 310 may re-evaluate incoming and outgoing PWs based on the communication link failure. In some instances, PW manager 310 may alter the state of a PW from active to standby or from standby to active, for example, as previously described with respect to FIGS. 1A and 1B. In other instances, PW manager 310 may not alter the state of a PW, for example, as described below with respect to FIGS. 4A and 4B. In one embodiment, when a failure occurs, PW manager 310 may select the PW associated with the lowest VE_ID as the active PW. In another embodiment, the selection of the active PW may be based on some other type of user-configured process.

Advertiser 315 may generate and advertise advertisements 120 to other PEs 110. In instances when PE 110 services more than one customer site, advertiser 315 may assign each customer site with the same LB parameter value and the same OFF parameter value, as previously described herein. In this way, PE 110 may obtain traffic from a remote PE 110 over a single PW. Further, even when PE 110 may lose a connection with one of its customer sites, in some instances, the PW for receiving traffic from the remote PE 110 may be unaffected.

Figure 3B:
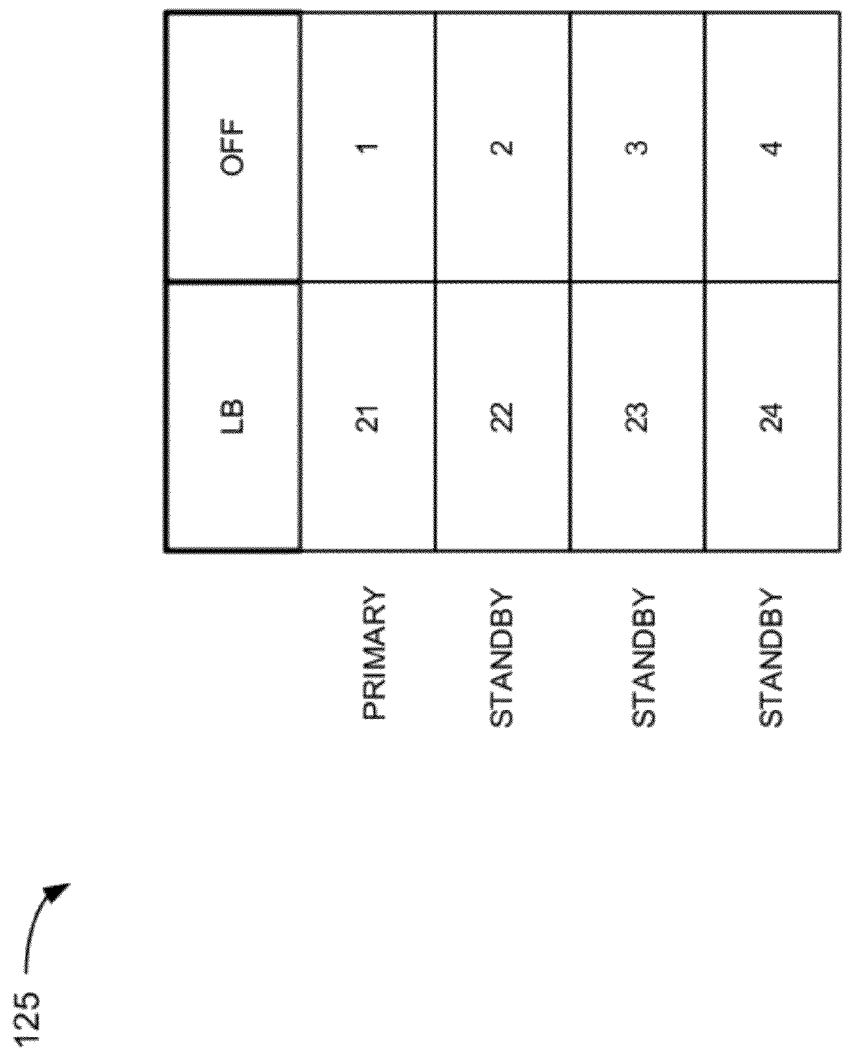
FIG. 3B is a diagram illustrating an exemplary PW table.
Figure 3C:
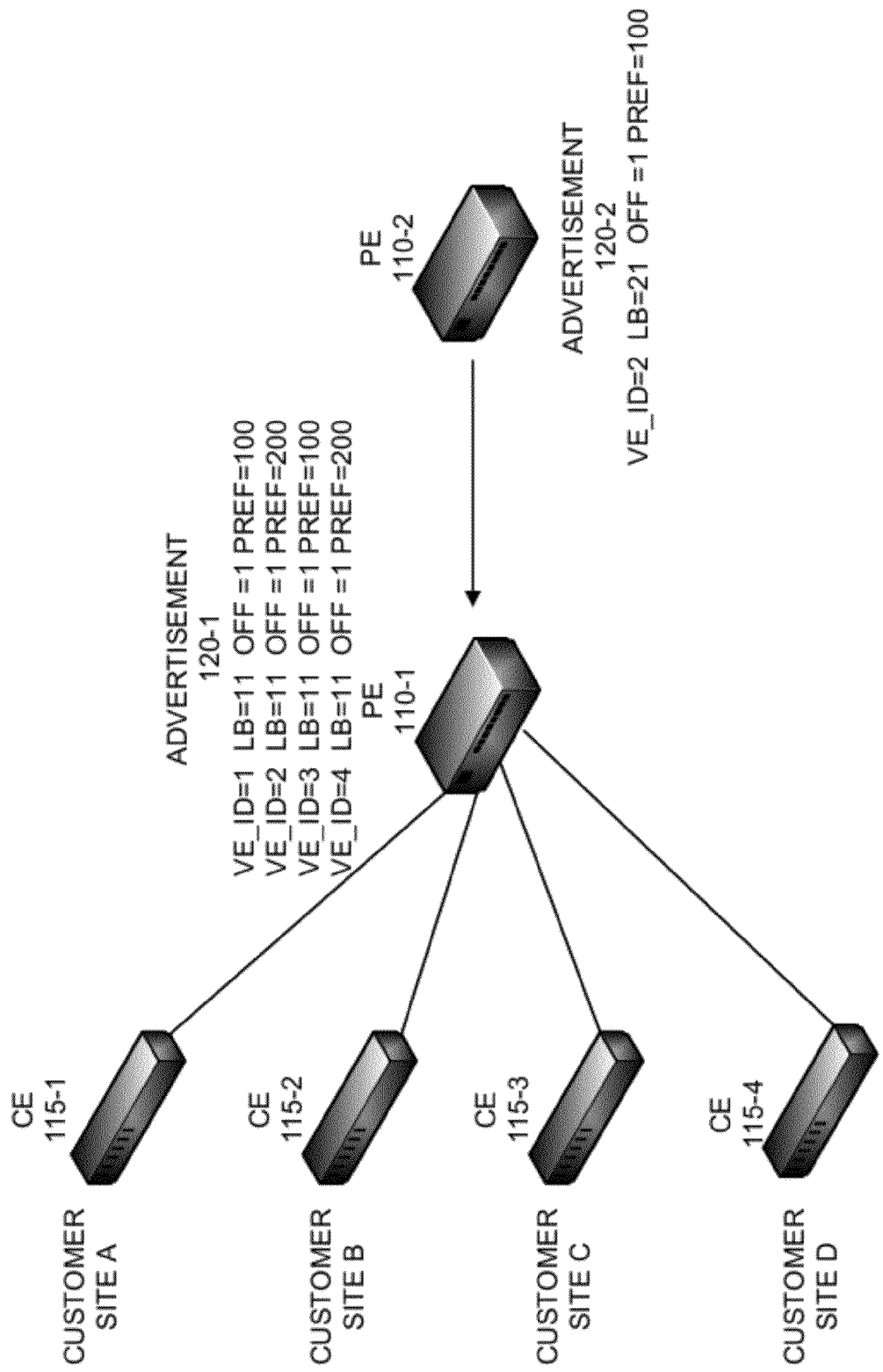
FIG. 3C is a diagram illustrating an exemplary scenario relating to the building of a PW table.

FIG. 3B is a diagram illustrating an exemplary PW table 125. Referring to FIG. 3B, PW builder 305 may build PW table 125 based on advertisement 120 received from another PE 110. For example, PE 110-1 may service four (4) customer sites (A) though (D) via four (4) CEs 115 (e.g., CE 115-1 through CE 115-4), as illustrated in FIG. 3C. Customer sites (A) through (D) may have corresponding VE_ID values (1) though (4), respectively. Assume that PE 110-1 receives advertisement 120-2.

PW builder 305 may build PW table 125 based on advertisement 120-2. For example, as illustrated in FIG. 3B, PW builder 305 may provide entries for four (4) PWs corresponding to the four customer sites (A) through (D). For example, PW table 125 may include PWs 21 through 24, where LB=21, associated with advertisement 120-2, provides a starting value for the PWs. PW table 125 may include OFF entries, where OFF=1, associated with advertisement 120-2, provides a starting value. As previously described, the OFF value may be mapped to the VE_IDs of customer sites (A) through (D). PW table 125 may designate a PW in the active (or primary) state and PWs in the standby state, as illustrated in FIG. 3B. PW manager 310 may setup PWs 21 through 24 based on PW table 125.

In one embodiment, PW table 125 may be implemented within, for example, a FIB. In other embodiments, PW table 125 may not be implemented within an FIB. For example, PW table 125 may be implemented via some other form of processing logic for processing advertisements 120.

As previously described, system control module 210 may, among other things, generate routing tables or FIBs. In one embodiment, system control module 210 may associate all addresses (e.g., media access control (MAC) addresses associated with a customer site) learned over the PWs with an address associated with PE 110 and not with the PW. In this way, addresses may not be lost when a PW changes state. For example, if a failure occurs and PW 21 changes to a standby state, the addresses associated with customer sites (A)-(D) may not be lost, or addresses associated with a customer site serviced by PE 110-2 may not be lost. This is in contrast to existing approaches where the addresses need to be rebuilt due to the tearing down and rebuilding of the PW.

Exemplary Scenario

Figure 4A:
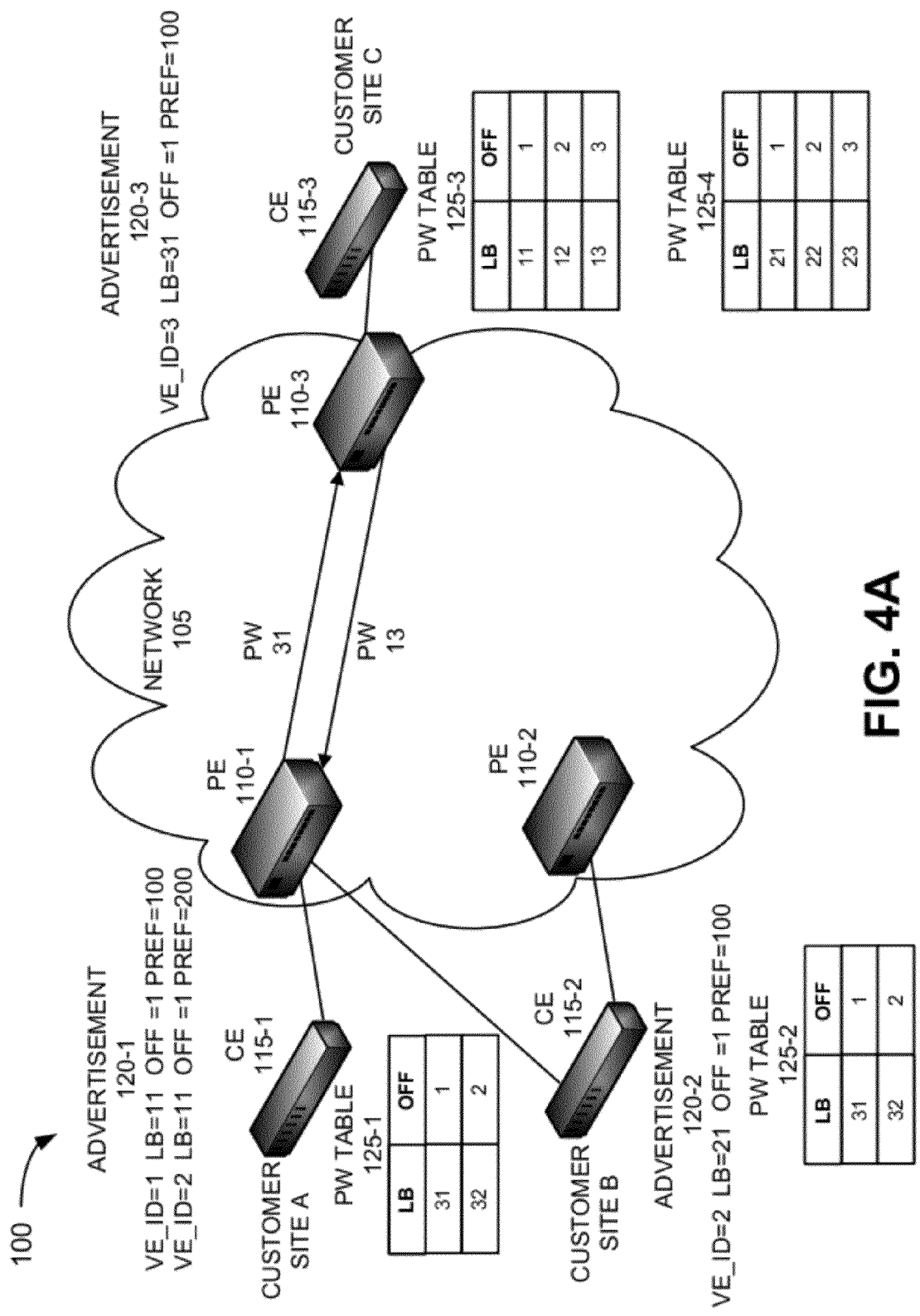
FIGS. 4A and 4B are diagrams illustrating an exemplary scenario in which redundant PWs may be setup and utilized.
Figure 4B:
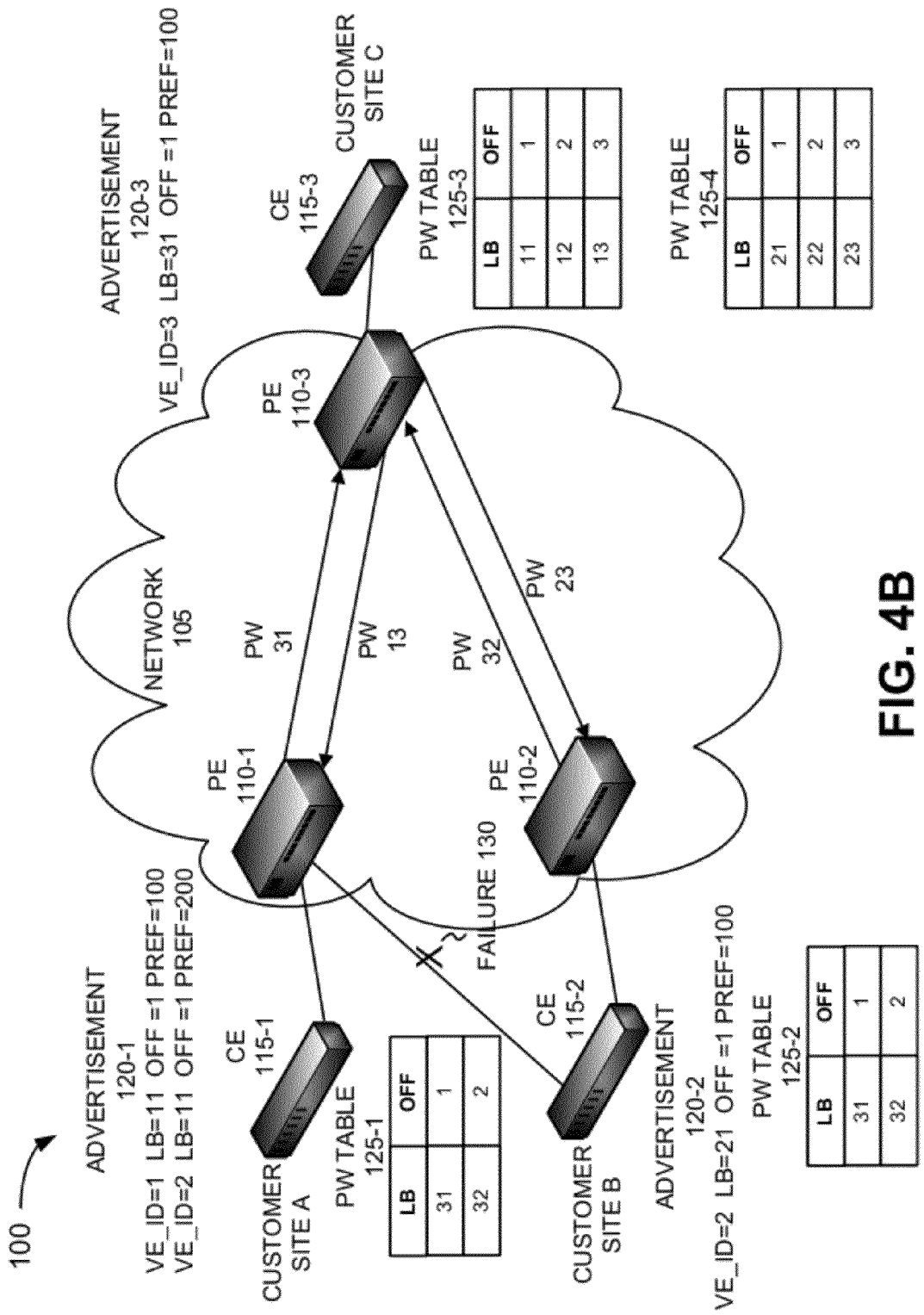

FIGS. 4A and 4B are diagrams illustrating an exemplary scenario in which redundant PWs may be setup and utilized. FIG. 4A includes environment 100, as previously illustrated and described with respect to FIGS. 1A and 1B. However, FIG. 4A includes additional PW tables since they are relevant to the described scenario. For example, PE 110-2 may, among other PW tables 125, have PW table 125-2 based on advertisement 120-3. Additionally, PE 110-3 may, among other PW tables 125, have PW table 125-4 based on advertisement 120-2. In an exemplary scenario, PE 110-1 may receive traffic from customer site C, via PE 110-3, for both customer sites A and B. Further, PE 110-1 may transmit traffic from customer sites A and B to customer site C, via PE 110-3.

Referring to FIG. 4B, assume that communication failure 130 occurs on the link between CE 115-2 and PE 110-1 (i.e., to customer site B). PE 110-1 may notify all other PEs (e.g., PE 110-2 and PE 110-3) of failure 130. As previously described, each PE 110 will re-evaluate the states of each PW (i.e., incoming PW and outgoing PW) with respect to the other PEs.

Referring to PE 110-1, the outgoing PW (i.e., PW 31) to PE 110-3 may remain unchanged based on PW table 125-1. That is, PW 31 may remain the active PW for outgoing traffic from customer site A to PE 110-3 since failure 130 does not relate to the connection between customer site A and PE 110-1. Similarly, the incoming PW (i.e., PW 13) from PE 110-3 to customer site A may remain unchanged. That is, PW 13 may remain the active PW for incoming traffic from customer site C to PE 110-1 since failure 130 does not relate to the connection between customer site A and PE 110-1.

As illustrated, however, as a result of failure 130, customer site B may not receive traffic from customer site C via PE 110-1. Additionally, since customer site B is multi-homed to both PE 110-1 and PE 110-2, upon receiving notice of failure 130, PE 110-2 may be designated as the PE 110 to forward traffic to customer site B (referred to as the designated forwarder (DF)). PE 110-2 may change the state of standby PW 32 to active PW 32. That is, PE 110-2 may re-evaluate the incoming PW for customer site B and change PW 32 to an active state. In this instance, both PW 31 and PW 32 may be designated as active PWs. Similarly, PE 110-2 may expect to receive traffic from customer site C, via PE 110-3, on PW 23. For example, referring to PW table 125-4, advertisement 120-3, associated with PE 110-3, has a VE_ID=3 which may be mapped to OFF=3 and LB=23 and corresponds to PW 23, as illustrated in FIG. 4B. PE 110-3 may designate PW 23 as the active PW to PE 110-2. As a result, customer sites A and B may not be impacted because of failure 130.

Exemplary Process

As described herein, PE 110 may setup and utilize redundant PWs. PE 110 may re-evaluate incoming PWs and outgoing PWs when a communication link failure occurs between PE 110 and CE 115. In some instances, PE 110 may utilize the redundant PWs to avoid traffic disruption to and/or from customer sites to which it services.

Process 500 may begin with generating PW tables (block 505). PE 110 may generate PW tables 125. For example, PW builder 305 may generate PW tables 125 based on advertisements 120 associated with other PEs 110. PW tables 125 may include LB and OFF entries based on LB and OFF parameters and values associated with advertisements 120. PW tables 125 may designate the state of PWs. For example, a PW may be designated as an active PW or a standby PW.

A VPLS advertisement may be generated and advertised to other PEs (block 510). PE 110 may generate and advertise advertisement 120. For example, advertiser 315 may generate and advertise advertisement 120 to other PEs 110. As previously described, advertisement 120 may include LB and OFF parameters and values. In the instance that PE 110 services more than one customer site, the LB and OFF parameter values may be the same for each customer site. Advertisement 120 may include a VE_ID parameter for each customer site. The VE_ID value may be a unique value for each customer site.

A communication link failure may be detected (block 515). PE 110 may detect a communication link failure (e.g., failure 130) between PE 110 and CE 115. For example, system control module 210 and/or interfaces 230 may detect a communication link failure.

The communication link failure may be broadcast to the other PEs (block 520). PE 110 may broadcast the communication link failure (e.g., failure 130) event to the other PEs 110. For example, PE manager 310 may notify the other PEs 110 of failure 130 between PE 110 and CE 115.

It may be determined whether an outgoing PW needs to be changed (block 525). PW manager 310 may re-evaluate and determine whether an outgoing PW needs to be changed in light of the communication link failure. PW manager 310 may determine whether an outgoing PW needs to be changed based on PW tables 125 and the CE 115 associated with the communication link failure. In one embodiment, if the VE_ID value associated with the CE 115 that corresponds to the communication link failure may be mapped to the active PW, then PW manager 310 may determine that the outgoing PW needs to be changed. By way of example, referring to FIG. 1B, the VE_ID associated with CE 115-1 (i.e., VE_ID=1) may be mapped to OFF=1 and PW 31, which was the active PW. In this case, PW manager 310 may determine that the outgoing active PW (i.e., PW 31) needs to be changed.

Alternatively, in one embodiment, if the VE_ID value associated with the CE 115 that corresponds to the communication link failure may not be mapped to the active PW, then PW manager 310 may determine that the outgoing PW does not need to be changed. By way of example, referring to FIG. 4B, the VE_ID associated with CE 115-2 (VE_ID=2) may be mapped to OFF=2 and PW 32, which was a standby PW. In this case, PW manager 310 may determine that the outgoing PW (i.e., PW 31) does not need to be changed.

If it is determined that an outgoing PW needs to be changed (block 525—YES), then a standby PW may be selected based on the PW tables (block 530). PW manager 310 may consult the appropriate PW table 125 to select the new active outgoing PW. In one embodiment, PW manager 310 may select the standby PW having the lowest VE_ID value to be the new active outgoing PW. In another embodiment, PW manager 310 may select the standby PW based on some other type of user-configured process. PW manager 310 may alter the state of the active PW (i.e., the active PW at the time of the failure) to a standby state. By way of example, referring back to FIG. 1B, PW manager 310 may select PW 32 as the active PW. PW manager 310 may designate PW 31 as a standby PW.

If it is determined that an outgoing PW does not need to be changed (block 525—NO), then process 500 may continue to block 535. By way of example, FIG. 4B illustrates an example case in which the outgoing PW (i.e., PW 31) from PE 110-3 to PE 110-1 did not need to be changed.

It may be determined whether an incoming PW needs to be changed (block 535). PW manager 310 may re-evaluate and determine whether an incoming PW needs to be changed in light of the communication failure. PW manager 310 may determine whether an incoming PW needs to be changed based on whether PE 110 remains the designated forwarder (DF) to the customer sites it services. For example, referring to FIG. 1B, although PE 110-1 and PE 110-2 are both connected to CE 115-2, PEs 110 may elect PE 110-1 as a DF for CE 115-2. An exemplary process for selecting the DF is described in RFC 4761. PW manager 310 may have knowledge for which customer sites PE 110 is considered the DF.

By way of example, referring to FIG. 1B, PE 110-1 may expect PE 110-3 to utilize PW 13 since PE 110-1 may still be considered the DF for CE 115-2 (customer site B). In other instances, this may not be the case. For example, referring to FIG. 4B, since CE 115-2 is multi-homed to both PE 110-1 and PE 110-2, when failure 130 occurs between PE 110-1 and CE 115-2 and is broadcast to the other PEs 110, PE 110-2 may be elected DF for CE 115-2. PE manager 310 may determine that an incoming PW needs to be changed based on this DF election.

If it is determined that an incoming PW needs to be changed (block 535—YES), then a standby PW may be selected based on the PW tables (block 540). For example, referring to FIG. 4B, PW builder may create PW tables 125 with respect to PE 110-2 and CE 115-2. PW manager 310 may select PW 21 as the incoming PW.

If it is determined that an incoming PW does not need to be changed (block 535—NO), then process 500 may continue to block 545. By way of example, FIG. 1B illustrates an example case in which the incoming PW (i.e., PW 13) from PE 110-3 to PE 110-1 did not need to be changed.

The incoming and outgoing PWs may be utilized (block 545). PE 110 may receive and transmit traffic utilizing the incoming and outgoing PWs associated with each of the other PEs 110.

Figure 5A:
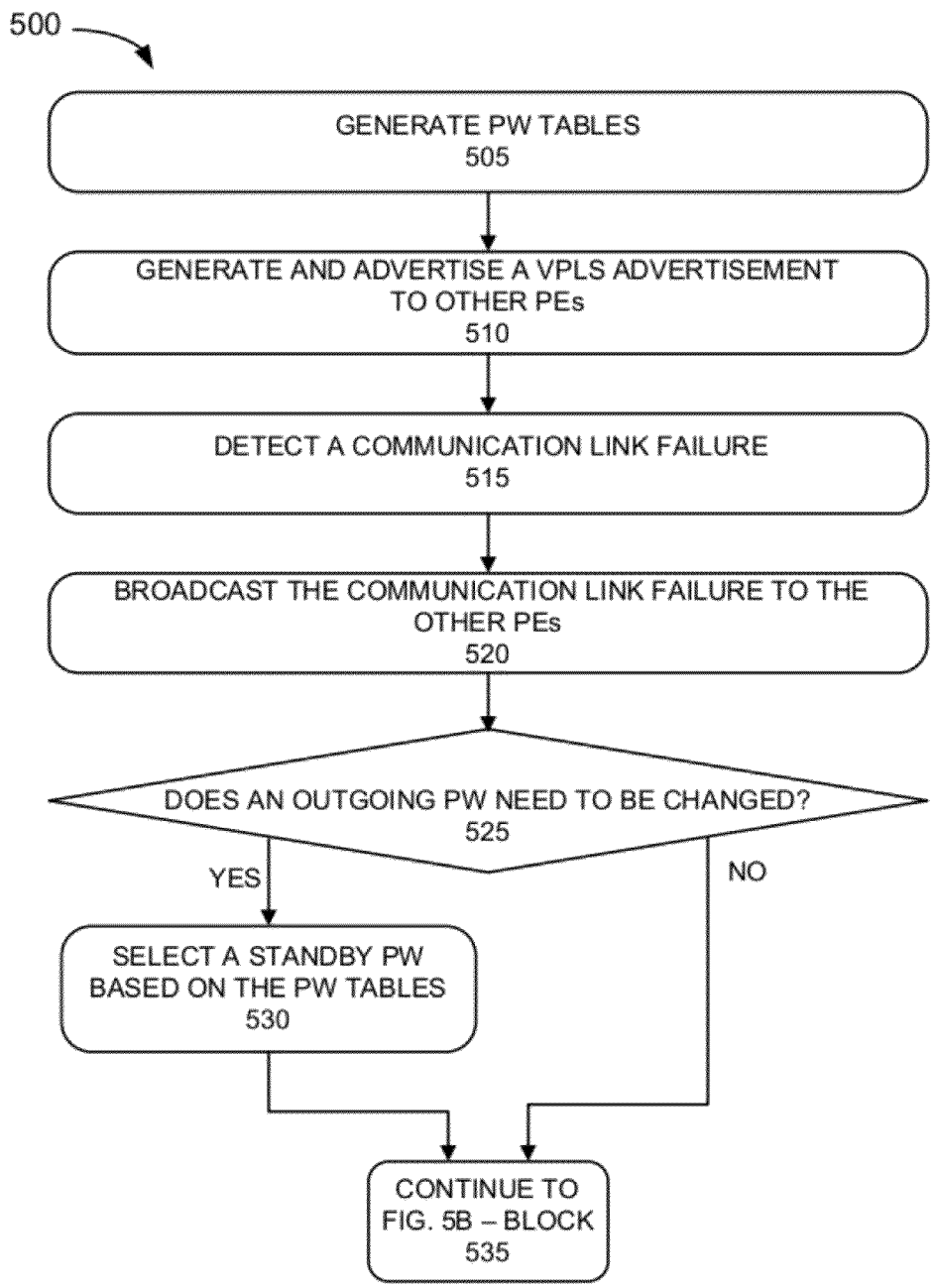
FIGS. 5A and 5B are flow diagrams illustrating an exemplary process for managing redundant PWs.
Figure 5B:
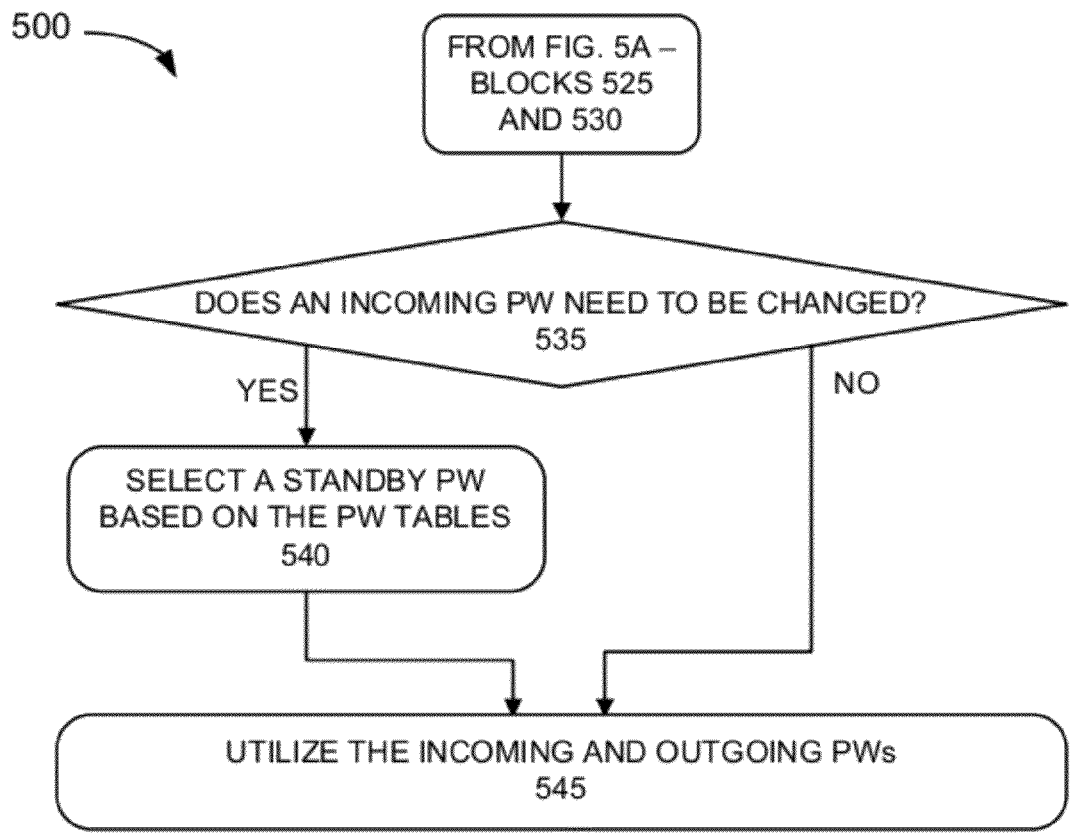

Although FIGS. 5A and 5B illustrate an exemplary process 500, in other implementations, fewer, additional, or different operations may be performed than depicted in FIGS. 5A and 5B.

CONCLUSION

In the embodiment described herein, PEs servicing multiple customer sites may setup and utilize redundant PWs to avoid traffic disruption to and/or from customer sites when a communication failure occurs. The PE may allocate the same set of label blocks to each of the customer sites so that any remote PE may create one PW for sending traffic to the PE. These allocations may be advertised to the other remote PEs.

The foregoing description of implementations provides an illustration, but is not intended to be exhaustive or to limit the implementations to the precise form disclosed. Modifications and variations are possible in light of the above teachings or may be acquired from practice of the teachings.

In addition, while a series of blocks has been described with regard to the process illustrated in FIGS. 5A and 5B, the order of the blocks may be modified in other implementations. Further, non-dependent blocks may be performed in parallel.

Also, certain aspects have been described as being implemented as "logic" or a "component" that performs one or more functions. This logic or component may include hardware, such as a processor, microprocessor, an ASIC, or a FPGA, or a combination of hardware and software, such as a processor/microprocessor executing instructions stored in a computer-readable medium.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language (e.g., "single") is used. Further, the phrase "based on" is intended to be interpreted as "based, at least in part, on," unless explicitly stated otherwise. The term "and/or" is intended to be interpreted to include any and all combinations of one or more of the associated list items. The term "table," as used herein, is intended to be broadly interpreted to include any type of data arrangement and/or data structure.

Even though particular combination of features are recited in the claims and/or disclosed in the specification, these combinations are not intended to limit the disclosure of the invention. In fact, many of these features may be combined in ways not specifically recited in the claims and/or disclosed in the specification.

No element, block, or instruction used in the present application should be construed as critical or essential to the implementations described herein unless explicitly described as such.

What is claimed is:

1. A method comprising:
   establishing, by a network device, an active pseudo-wire and a standby pseudo-wire, with respect to another network device, based on a virtual private local area network service (VPLS) advertisement transmitted between the network device and the other network device;
   detecting, by the network device, a communication link failure associated with a customer device, of a plurality of customer devices associated with the active pseudo-wire and the standby pseudo-wire;
   determining, based on detecting the communication link failure and for each customer device, of the plurality of customer devices, whether an identification value, associated with the customer device, corresponds to the active pseudo-wire; and
   determining, for each customer device, of the plurality of customer devices, not to utilize the standby pseudo-wire when the identification value does not correspond to the active pseudo-wire, where the network device utilizes the standby pseudo-wire, rather than the active pseudo-wire, when the identification value corresponds to the active pseudo-wire.

2. The method of claim 1, further comprising:
   changing, for a particular customer device, of the plurality of customer devices, the standby pseudo-wire to an active state and the active pseudo-wire to a standby state when the identification value, associated with the particular customer device, corresponds to the first pseudo-wire.

3. The method of claim 1, further comprising:
   broadcasting, by the network device, information identifying the communication link failure to the other network device to cause the other network device to change a pseudo-wire, established by the other network device, from a standby state to an active state and to begin providing a service to a first customer device, of the plurality of customer devices, when the identification value of the first customer device corresponds to the active pseudo-wire.

4. The method of claim 3, further comprising:
   utilizing, prior to detecting the communication link failure, the active pseudo-wire, and not the standby pseudo-wire, with respect to the other network device, to provide data to the plurality of customer devices; and
   utilizing the standby pseudo-wire, with respect to the other network device, to provide data to a second customer device, of the plurality of customer devices, based on the broadcasting, where the second customer device is different from the first customer device.

5. The method of claim 1, where the network device and the other network device comprise provider edge devices that service the plurality of customer devices within a VPLS multi-homed network.

6. The method of claim 1, further comprising:
   receiving, by the network device, the VPLS advertisement from the other network device, where the VPLS advertisement includes the identification value, a label base value, and an offset value;
   generating a pseudo-wire table based on receiving the VPLS advertisement; and
   where determining whether the identification value corresponds to the active pseudo-wire includes:
     utilizing the label base value and the offset value to determine whether the identification value to a value that corresponds to the active pseudo-wire table.

7. The method of claim 6, where generating the pseudo-wire table includes:
   utilizing the label base value and the offset value as starting value entries for the pseudo-wire table.

8. A network device comprising:
   a memory to store information associated with another network device, where the information is generated based on a virtual private local area network service (VPLS) advertisement received from the other network device; and a processor to:
- establish an active pseudo-wire and a standby pseudo-wire with respect to the other network device based on the stored information,
- detect a communication link failure associated with a customer device, where the customer device is associated with the established active pseudo-wire and the standby pseudo-wire,
- determine, in response to detecting the communication link failure, whether an identification value, associated with the customer device, is associated with:
  - a value that corresponds to the active pseudo-wire, and
  - the stored information, and
- determine not to utilize the standby pseudo-wire when the identification value, associated with the customer device, is not associated with the value that corresponds to the active pseudo-wire, where the network device utilizes the standby pseudo-wire, rather than the active pseudo-wire, when the identification value is associated with the value that corresponds to the active pseudo-wire and is associated with the stored information.

9. The network device of claim 8, where the processor is further to:
- change the standby pseudo-wire to an active state and the active pseudo-wire to a standby state when the identification value maps to the value that corresponds to the first pseudo-wire and is associated with the stored information.

10. The network device of claim 8, where the active pseudo-wire and the standby pseudo-wire are associated with the customer device and another customer device, and
where the processor is further to:
- utilize, prior to detecting the communication link failure, the first pseudo-wire, and not the second pseudo-wire, with respect to the other network device, to provide data to the customer device and the other customer device, and
- utilize the second pseudo-wire, with respect to the other network device, to provide data to the other customer device when the identification value corresponds to the value that corresponds to the first pseudo-wire and is associated with the stored information.

11. The network device of claim 8, where the processor is further to:
- broadcast information identifying the communication link failure to the other network device to cause the other network device to change a pseudo-wire, established by the other network device, from a standby state to an active state and to begin providing a service to the customer device when the identification value corresponds to the value that corresponds to the first pseudo-wire and is associated with the stored information.

12. The network device of claim 8, where the network device and the other network device comprise provider edge devices that service the customer device within a VPLS multi-homed network.

13. The network device of claim 8, where the processor is further to:
- receive the VPLS advertisement from the other network device, where the VPLS advertisement includes the identification value, a label base value, and an offset value,
- generate the stored information based on receiving the VPLS advertisement, and
- where, when determining whether the identification value corresponds to the value that corresponds to the active pseudo-wire and is associated with the stored information, the processor is to:
  - utilize the label base value and the offset value to determine whether the identification value corresponds to the value that corresponds to the active pseudo-wire table.

14. The network device of claim 13, where, when generating the stored information, the processor is to:
- utilize the label base value and the offset value as starting value entries for a pseudo-wire table included in the stored information.

15. A non-transitory computer-readable medium storing instructions, the instructions comprising:
- one or more instructions which, when executed by at least one processor, cause the at least one processor to establish an active pseudo-wire and a standby pseudo-wire with respect to another network device based on a data structure generated based on a virtual private local area network service (VPLS) advertisement transmitted between the network device and the other network device;
- one or more instructions which, when executed by the at least one processor, cause the at least one processor to detect a failure of a link associated with a customer device, where the customer device is associated with the established active pseudo-wire and the established standby pseudo-wire;
- one or more instructions which, when executed by the at least one processor, cause the at least one processor to determine, in response to detecting the failure of the link, whether an identification value, associated with the customer device, maps to a value that corresponds to the active pseudo-wire and is associated with the data structure; and
- one or more instructions which, when executed by the at least one processor, cause the at least one processor to determine not to utilize the standby pseudo-wire when the identification value, associated with the customer device, does not map to the value that corresponds to the active pseudo-wire, where the network device utilizes the standby pseudo-wire, rather than the active pseudo-wire, when the identification value maps to the value that corresponds to the active pseudo-wire and is associated with the data structure.

16. The computer-readable medium of claim 15, where the instructions further comprise:
- one or more instructions to change the standby pseudo-wire to an active state and the active pseudo-wire to a standby state when the identification value maps to the value that corresponds to the active pseudo-wire and is associated with the data structure.

17. The computer-readable medium of claim 15, where the active pseudo-wire and the standby pseudo-wire are associated with the customer device and another customer device, and
where the instructions further comprise:
- one or more instructions to utilize, prior to detecting the communication link failure, the active pseudo-wire, and not the standby pseudo-wire, with respect to the other network device, to provide data to the customer device and the other customer device; and
- one or more instructions to utilize the standby pseudo-wire, with respect to the other network device, to provide data to the other customer device when the identification value maps to the value that corresponds to the active pseudo-wire and is associated with the data structure.

18. The computer-readable medium of claim 15, where the instructions further comprise:

one or more instructions to broadcast information identifying the failure to the other network device to cause the other network device to change a pseudo-wire, established by the other network device, from a standby state to an active state and to begin providing a service to the customer device when the identification value maps to the value that corresponds to the active pseudo-wire and is associated with the data structure.

19. The computer-readable medium of claim 15, where the instructions further comprise:

one or more instructions to receive the VPLS advertisement from the other network device, where the VPLS advertisement includes the identification value, a label base value, and an offset value;

one or more instructions to generate the data structure based on receiving the VPLS advertisement; and where the one or more instructions to determine whether the identification value maps to the value that corresponds to the active pseudo-wire and is associated with the pseudo-wire table include:

one or more instructions to utilize the label base value and the offset value to determine whether the identification value maps to the value that corresponds to the data structure.

20. The computer-readable medium of claim 19, where the one or more instructions to generate the data structure include:

one or more instructions to utilize the label base value and the offset value as starting value entries for the data structure.

* * * * *